No. 780,690. PATENTED JAN. 24, 1905.
T. M. THOMAS & C. KNAUP.
CORN PLANTER.
APPLICATION FILED MAR. 18, 1904.
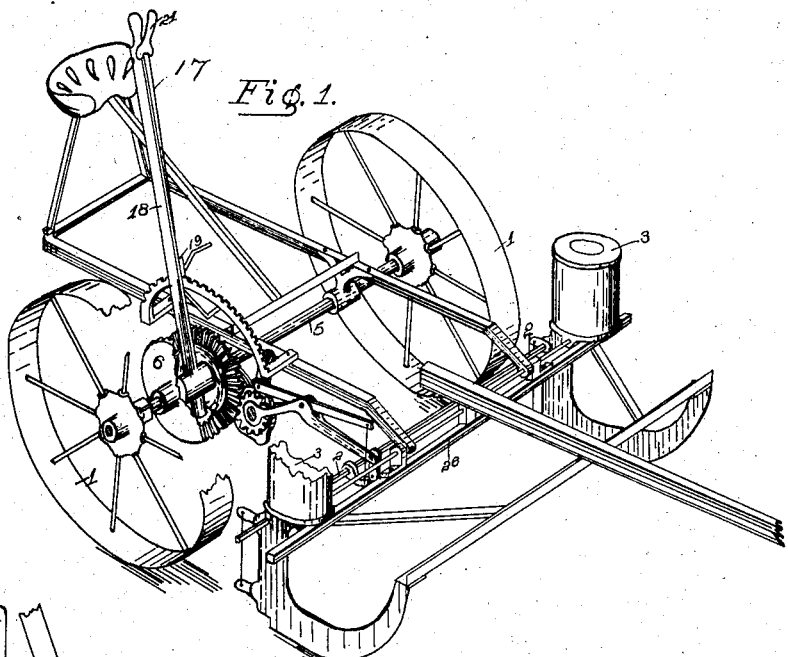
Fig. 1.
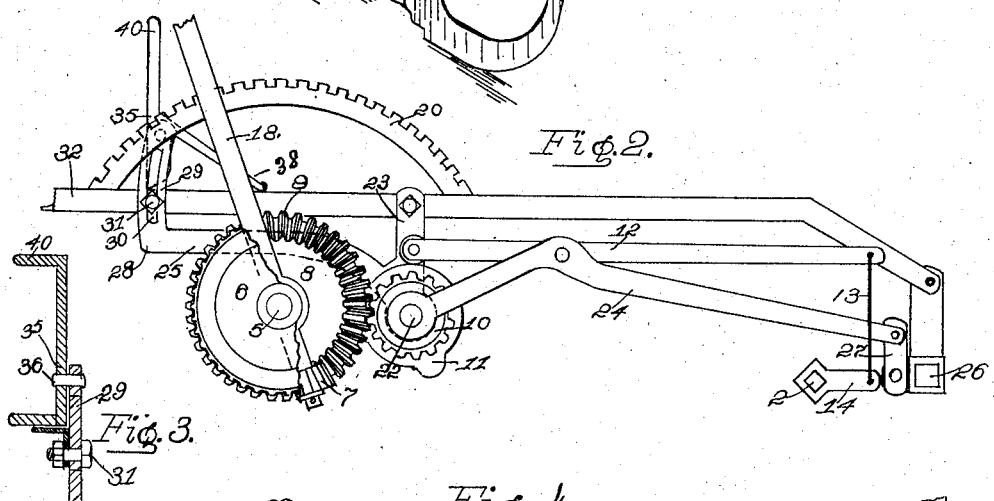
Fig. 2.
Fig. 3.
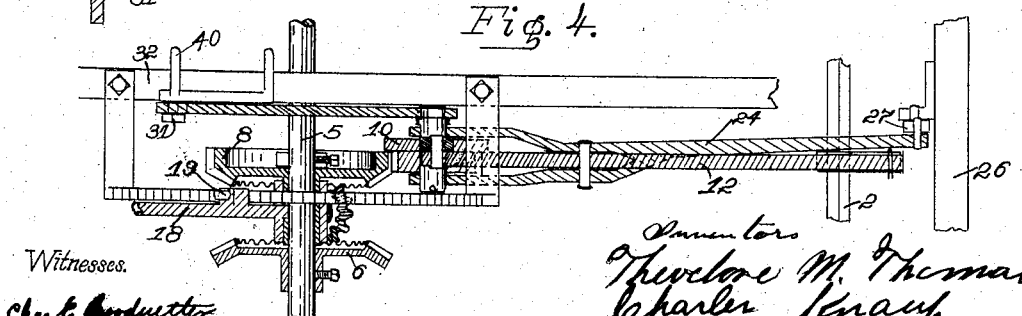
Fig. 4.
Witnesses.
Inventors
Theodore M. Thomas
Charles Knaup
By Erwin & Wheeler
Attorneys.

No. 780,690.

Patented January 24, 1905.

UNITED STATES PATENT OFFICE.

THEODORE M. THOMAS AND CHARLES KNAUP, OF BEAVERDAM, WISCONSIN.

CORN-PLANTER.

SPECIFICATION forming part of Letters Patent No. 780,690, dated January 24, 1905.

Application filed March 18, 1904. Serial No. 198,715.

*To all whom it may concern:*

Be it known that we, THEODORE M. THOMAS and CHARLES KNAUP, citizens of the United States, residing at Beaverdam, county of Dodge, and State of Wisconsin, have invented new and useful Improvements in Corn-Planters, of which the following is a specification.

Our invention relates to improvements in check-row corn-planters.

The object of our invention is to provide means for compensating for inequalities of the ground over which the planter passes, whereby the seed may be dropped at equal distances in a horizontal line regardless of the vertical irregularities of the ground, this result being accomplished without the use of the gage-wire usually employed for controlling the operation of the dropping mechanism. Heretofore it has been attempted to accomplish such results by means of clutch-gears or by employing special gears operated by hand to accelerate or retard the action of the dropping mechanism; but such devices have generally been discarded, the same not being sufficiently quick or positive in their action.

Our invention, however, contemplates the provision of means for merely shifting the motion-transmitting connections to hasten or retard the action of the dropping mechanism, whereby each readjustment is rendered quick, positive, and certain.

In the following description reference is had to the accompanying drawings, in which—

Figure 1 is a perspective view of the essential features of a corn-planter embodying our invention with a portion of the motion-transmitting connections broken away. Fig. 2 is a side view of the motion-transmitting connections for actuating the dropping mechanism with the driving gear-wheel partly broken away to show the motion-transmitting pinion. Fig. 3 is a sectional view drawn on a vertical line extending through the pivotal axis of the trip. Fig. 4 is a detail plan view of the dropping-cam and its support.

Like parts are identified by the same reference characters throughout the several views.

As is customary in such machines, the frame of the planter is mounted upon supporting-wheels 1, from which motion is transmitted to suitable dropping mechanism connected with a transverse rod 2, which extends underneath the seed chambers or hoppers 3, as shown in Fig. 1. Any suitable means may be employed for dropping or delivering the seed from the chambers 3 to the ground, and we have therefore not illustrated this portion of the planter in detail, it being sufficient to state that the seed-dropping mechanism is operated in any suitable manner by oscillating or rotating the rod 2 at the desired intervals. These intervals are determined by the motion-transmitting connections, the motion being communicated from the vehicle wheel or wheels through the axle or driving shaft 5, beveled gear-wheel 6, fixed thereon, pinion 7, loose beveled gear-wheel 8, spur gear-teeth 9 thereon, pinion 10, cam 11, lever 12, link 13, and arm 14, the latter being connected with the rod 2 of the dropping mechanism. The pinion 7 is mounted upon a controlling-lever 18, which is pivoted on the axle-shaft 5 and held in any desired position of adjustment by means of a latch 19, which is arranged to engage a toothed segment 20, the latch being retracted (when it is desired to adjust the lever) by means of a thumb-lever 21 and link 17. It is obvious that by swinging the controlling-lever 18 the pinion may be caused to travel backwardly or forwardly over the face of the gear-wheel 6 to vary the speed of the loose gear-wheel 8 in correspondence with the distance traveled by the pinion and that the action of the dropping mechanism will be varied accordingly. For example, if the pinion is caused to travel with the fixed gear-wheel the motion of the loose gear-wheel will be checked, stopped, or reversed, according to the speed of pinion movement. On the other hand, if the pinion be shifted in a direction opposite to the movement of the driving gear-wheel 6 the motion of the loose gear-wheel will be increased in proportion to the speed of such pinion travel. The normal speed of the respective parts is instantly resumed when the controlling-lever is brought to rest.

The pinion 10 and cam 11 are mounted upon a shaft 22, supported by pivotal hangers 23 from the machine-frame. The shaft 22 is also journaled in and supports a forked bar 24, which at its front end is connected with a cross-bar 26 of the machine-frame by means of a link 27. The lever 12 is pivotally fulcrumed upon this bar. A bar 25, in which the shaft 22 is also journaled, extends rearwardly and is provided with an elbow at 28 and an upwardly-projecting arm 29, having a slot 30, through which a bolt 31 passes and loosely connects this end of the bar with a frame-bar 32. The bar 25 is held in its normal position by means of a trip 35, which is pivoted at 36 to the part 29 and is provided with a forwardly-extending arm 38, which normally bears upon the frame-bar 32 and holds the trip with its point also resting on the holds frame-bar slightly in the rear of the bolt 31. The trip is also provided with an upwardly-projecting arm 40, which may be pressed rearwardly by the foot of the operator until the point of the trip moves forwardly past the bolt 31, whereupon the bar 25 will be left unsupported and permitted to drop until the bolt 31 engages the upper end of the slot, thus causing the pinion 10 to swing forwardly on its supporting-shaft and hangers 23 until the pinion 10 is disengaged from the spur-teeth 9. The link 27 permits the bar 24 to also move forwardly, so that it does not prevent the hangers 23 from swinging upon their pivotal connection with the frame.

The above-described operation of the trip is resorted to in emergencies and at the end of a row when it is desired to stop the operation of the dropping mechanism.

It will of course be understood that the controlling-lever when shifted does not permanently vary the dropping interval, but merely shortens or prolongs the specific interval during which the lever is shifted.

Having thus described our invention, what we claim as new, and desire to secure by Letters Patent, is—

1. In a corn-planter, the combination with dropper-actuating mechanism, of a driving-shaft; a gear-wheel fixed thereon; a second gear-wheel loose on the shaft; a pinion arranged to transmit motion from one gear-wheel to the other; means for shifting said pinion in a circular path whereby the speed of the driven gear-wheel is varied during the shifting movement; and means for transmitting the motion of the loose gear-wheel to the actuating connections of the dropper.

2. In a corn-planter, the combination with a cam arranged to control the action of the dropping mechanism of a driving-shaft; a set of fast and loose gear-wheels thereon; a motion-transmitting pinion in mesh with said gear-wheels and pivotally supported from the driving-shaft; means for communicating motion from one of said gear-wheels to said cam; and means for swinging said pinion upon its pivotal support.

3. In a corn-planter, the combination of a wheeled vehicle, provided with dropping mechanism and an operator's seat; of a movable part adapted to actuate the dropping mechanism; a driving-shaft; a wheel arranged to be normally actuated from the driving-shaft and also rotatable independently; connections for transmitting an intermittent movement from the wheel to said movable part; a controlling-lever pivotally mounted on the axis of the wheel; means for transmitting a swinging movement of the controlling-lever to advance or retard said wheel; and manually-controlled connections, operative from the operator's seat, for adjusting said lever to different radial positions with reference to said wheel, and locking and unlocking the same while said vehicle is in motion.

4. In a corn-planter, the combination of a driving-shaft; fixed and loose gear-wheels thereon; a controlling-lever through which said shaft passes; a pinion journaled on said controlling-lever and arranged to transmit motion from the fixed to the loose gear-wheels; a dropper-actuating lever; and means for transmitting motion from the loose gear-wheels to the dropper-actuating lever at definite intervals in the rotation of the loose gear-wheel.

5. In a corn-planter, the combination of an actuating-lever, controlling a portion of the dropping mechanism; a cam arranged to intermittingly actuate said lever; a driving-shaft; motion-transmitting connections between the driving-shaft and the cam; and means for shifting the relative positions of said motion-transmitting connections to vary the speed thereof during the shifting movement without permanently changing the character of the motion transmitted.

6. In a corn-planter, the combination of a lever adapted to operate the dropping mechanism; a driving-shaft; means for transmitting an intermittent motion from the driving-shaft to said lever; means for shifting the relative positions of the motion-transmitting mechanism to hasten or delay the intervals of lever movement; and means for disengaging the motion-transmitting connections.

7. In a corn-planter, the combination with a rod adapted to actuate suitable operating mechanism; of a driving-shaft; fast and loose gear-wheels thereon; a controlling-lever journaled upon the shaft; a pinion journaled upon the controlling-lever and arranged to transmit motion between the fast and loose gear-wheels; means for holding the controlling-lever in any desired position of adjustment; motion-transmitting connections between the loose gear-wheel and the actuating-rod of the dropping mechanism; a bar supporting said motion-transmitting connections; and means for adjusting said bar to move said connections into and out of operative position.

8. In a corn-planter, the combination of a vehicle provided with suitable dropper-actuating mechanism; a movable support for a portion of said mechanism; a pivotal trip-arm adapted to move along the frame past the vertical line of its pivot and normally retaining said support with the mechanism in operative position; and a trip-releasing lever, adapted, when actuated, to move the trip-arm backwardly across the vertical pivot-line whereby the support is permitted to drop by gravity.

9. In a corn-planter, the combination of a vehicle provided with suitable automatic dropper-actuating mechanism; a support for a portion of said mechanism, having swinging connection with the vehicle-frame; an elbowed bar connected with the support and having an upwardly-projecting portion slidably connected with the frame; a trip pivotally secured to the upwardly-projecting portion, and supporting said bar from the frame; and a trip-releasing arm, adapted to adjust the trip into and out of supporting position; said support for the dropper-actuating mechanism being adapted to swing out of operative position when the elbowed bar is released.

In testimony whereof we affix our signatures in the presence of two witnesses.

THEODORE M. THOMAS.
CHARLES KNAUP.

Witnesses:
CHAS. E. GOODNETTER,
CHARLES McGILL.